Feb. 8, 1955     E. L. HARDER     2,701,860
POWER MEASURING CIRCUIT
Filed April 7, 1951
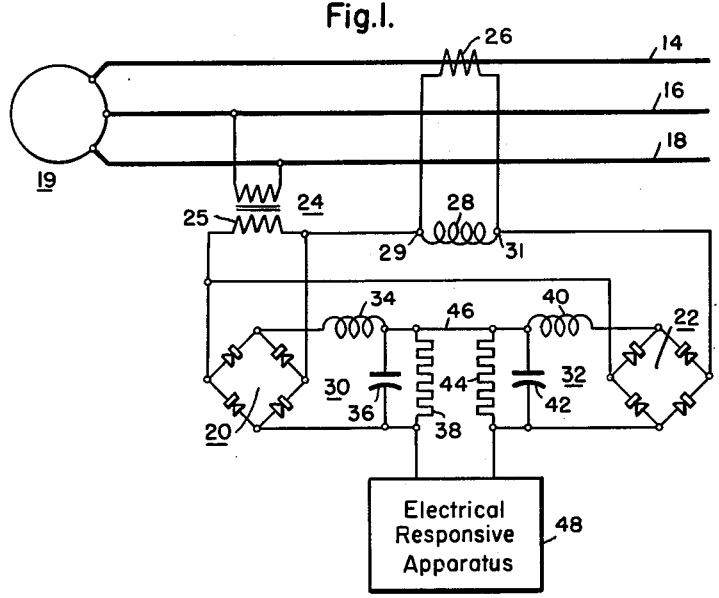
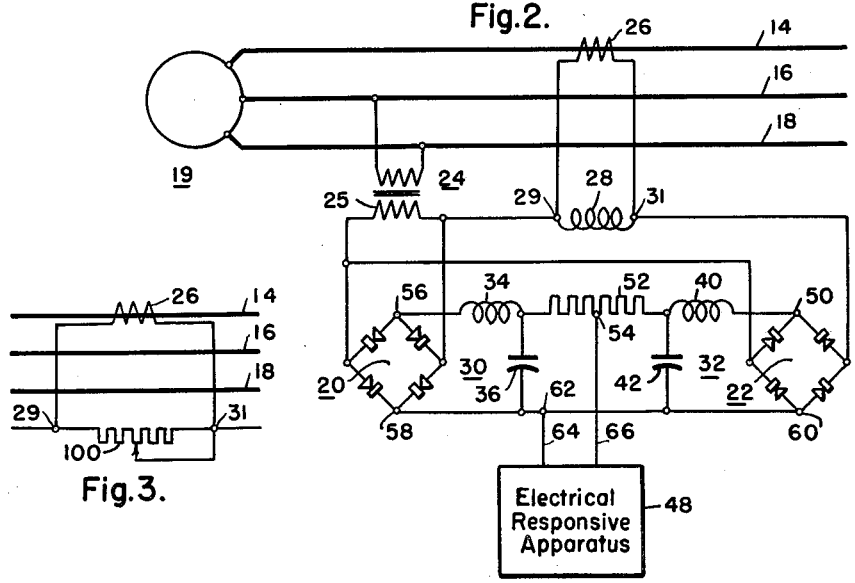
WITNESSES:
INVENTOR
Edwin L. Harder.
BY
ATTORNEY

United States Patent Office 2,701,860
Patented Feb. 8, 1955

2,701,860

POWER MEASURING CIRCUIT

Edwin L. Harder, Pittsburgh, Pa., assignor to Westinghouse Electric Corporation, East Pittsburgh, Pa., a corporation of Pennsylvania Application April 7, 1951, Serial No. 219,857

6 Claims. (Cl. 324—141)

This invention relates to measuring circuits and in particular to watt measuring circuits.

Various types of watt measuring circuits have been utilized for measuring a line load. One type of watt measuring circuit comprises a pair of heaters, one of the heaters having a voltage impressed across it that is a measure of the sum of the line current and line voltage while the other heater has impressed across it a voltage that is a measure of the difference between the line current and the line voltage. Since there is a different voltage across the two heaters for any given condition, a temperature difference exists between them. When there is any change in either the line voltage or line current there is a change in the temperature difference which exists between the pair of heaters. A series of thermocouples are responsive to this difference in temperature, and they set up a direct current output which is proportional to the product of the line voltage and current and, therefore, to load. However, the above-described watt measuring circuit has definite disadvantages. For instance, its speed of response is relatively slow and it has a relatively small power output as compared to its input power.

An object of this invention is the provision of a new and improved watt measuring circuit having a high speed of response.

Another object of this invention is the provision of a watt measuring circuit the output of which gives an approximately true measure of watts.

A further object of this invention is the provision of a watt measuring circuit the power output of which is relatively high compared to its power input.

Other objects of this invention will become apparent from the following description when taken in conjunction with the accompanying drawing, in which:

Figure 1 is a diagrammatic representation of an embodiment of the watt measuring circuit constituting the teachings of this invention;

Fig. 2 is a diagrammatic representation of another embodiment of the watt measuring circuit constituting the teachings of this invention; and Fig. 3 illustrates a modification of a portion of the apparatus as shown in Figs. 1 and 2.

Referring to Fig. 1 of the drawing, there is illustrated a watt measuring circuit constituting an embodiment of the teachings of this invention. The watt measuring circuit is disposed to measure the in-phase power flowing in an approximately balanced three-phase circuit represented by the line conductors 14, 16 and 18, the line conductors being supplied by a generator 19 having a substantially constant output voltgage. As illustrated, the watt measuring circuit comprises two dry type rectifier units 20 and 22, a potential transformer 24 having a secondary winding 25, a current transformer 26 which is associated with the line conductor 14, a reactor 28, and terminals 29 and 31 to which the reactor 28 is electrically connected.

In order to obtain a voltage across the input to the rectifier 20 that is a measure of the line voltage, the input terminals of the rectifier 20 are electrically connected through the potential transformer 24 to the line conductors 16 and 18. In like manner in order to obtain a voltage across the input to the rectifier 22 that is a measure of the vector sum of the (1) line voltage and (2) a constant times the line current, the reactor 28 is electrically connected across the current transformer 26 to provide a voltage across the reactor 28 that is a measure of the line current, and the reactor 28 and the secondary winding 25 of the potential transformer 24 are electrically connected in series across the input terminals of the rectifier 22. The magnitude of the constant used as a multiplying factor for the line current is dependent upon the accuracy required of the power measuring circuit, and this constant may have numerous values depending on design problems. For example, for good accuracy over a wide range of power factor for the circuit as represented by the line conductors 14, 16, and 18 the voltage appearing across the secondary winding 25 of the transformer 24 should have a relatively large magnitude and the voltage appearing across the reactor 28 should have a small magnitude compared to the magnitude of the voltage appearing across the secondary winding 25. Of course, if the magnitude of the voltage appearing across the secondary winding 25 is too great the cost of the power measuring circuit will likewise be high. All these factors must be taken into consideration when designing the power measuring circuit.

While the voltage across the input to the rectifier 22 is a measure of the vector sum of the (1) line voltage and (2) a constant times the line current as described hereinbefore, in order to simplify the claims, the expression "measure of the vector sum of the line voltage and line current" has been employed, it being understood however that the line current is in all cases multiplied by a constant depending upon the design problems. In addition, the term "power" is defined herewithin as equal to $EI \cos(\theta + \phi)$ in which $\theta$ represents the angle between E and I. When measuring active power, the symbol $\phi = 0°$, and when measuring reactive power, $\phi = 90°$. Thus, when measuring power generally, $\phi$ equals any specified angle.

Filter circuits 30 and 32 are electrically connected to the output terminals of the rectifiers 20 and 22, respectively. As illustrated, the filter circuit 30 comprises a smoothing reactor 34 and a capacitor 36. The smoothing reactor 34 and the capacitor 36 are electrically connected in series circuit relation across the output terminals of the rectifier 20, and a load resistor 38 is electrically connected across the capacitor 36.

Likewise, the filter circuit 32 comprises a smoothing reactor 40 and a capacitor 42, the smoothing reactor 40 and the capacitor 42 being electrically connected in series circuit relation across the output terminals of the rectifier 22. A load resistor 44 is electrically connected across the capacitor 42.

One end of the load resistor 44 is electrically connected to one end of the load resistor 38 by means of conductor 46 with the polarities of the voltages impressed across the load resistors 38 and 44 opposed so that the sum of such voltages will be a measure of the difference between the voltage input to the rectifier 20 and the voltage input to the rectifier 22. The voltage that appears across the series connected load resistors 38 and 44 is thus a measure of the in-phase power flowing in the three-phase circuit represented by the line conductors 14, 16 and 18.

In order to measure or utilize the measure of the in-phase power, the direct-current output voltage of the watt measuring circuit is connected to electrical responsive apparatus such as a voltmeter or suitable control apparatus represented by the rectangle 48. Thus the rectangle 48 is electrically connected across the series connected load resistors 38 and 44 of the watt measuring circuit.

In operation, with the generator 19 disposed to supply a substantially constant line voltage and a variable line current depending upon the demands of the load (not shown), a voltage is produced across the load resistors 38 and 44 which is a measure of the in-phase power flowing in the line conductors 14, 16 and 18. Assuming there is an increase in the current flow through the line conductors 14, 16 and 18 there will be an increase in the current flow through the current transformer 26, thus increasing the voltage impressed across the reactor 28. The increased voltage across the reactor 28 combined with that voltage appearing across the secondary winding 25 of the transformer 24 will increase the voltage across the input terminals of the rectifier 22, thus increasing the output of the rectifier 22 and the voltage impressed across the load resistor 44. An increased voltage across the load resistor 44 will increase the combined voltage appearing across the load resistors 38 and 44 as well as the voltage output of the watt measuring circuit.

However, if there is a decrease in the current flow through the line conductors 14, 16 and 18, there will be a decrease in the voltage impressed across the reactor 28, as well as across the input terminals to the rectifier 22. This will decrease the output of the rectifier 22 and the voltage across the load resistor 44, thus decreasing the voltage that appears across the load resistors 38 and 44 combined.

It is, of course, to be understood that if the power flowing through the line conductors 14, 16 and 18 flows from right to left instead of from left to right, as hereinbefore described, the voltage appearing across the rectifier 22 would be less than that voltage appearing across the rectifier 20 since the voltage appearing across the reactor 28 would be subtractive from that voltage appearing across the secondary winding 25 of the transformer 24. Thus the direction of flow of power through the line conductors 14, 16 and 18 will determine the polarity of the voltage appearing across the load resistors 38 and 44 combined.

Referring to Fig. 2 of the drawing, there is shown another embodiment of the watt measuring circuit illustrating the teachings of this invention. In this embodiment, the output circuit of the watt measuring circuit is modified from the output circuit shown in Fig. 1 of the drawing, otherwise the same numerals are employed for identifying identical components of the embodiments of Figs. 1 and 2.

In the embodiment of Fig. 2, the output terminals of full wave rectifiers 20 and 22 are connected in series circuit relation with each other, the terminals 50 of rectifier 22 being connected through a load resistor 52 having a center tap 54 to the terminal 56 of the rectifier 20, the terminals 58 and 60 of the rectifiers 20 and 22, respectively, being electrically connected together.

A rectangle 48 representing either a voltmeter or control or other responsive apparatus is electrically connected to the center tap 54 of the load resistor 52 and to a tap 62 in the connection between the terminals 58 and 60 by means of conductors 64 and 66 so as to obtain a measure of the in-phase power flowing in the three-phase circuit represented by the line conductors 14, 16 and 18.

In operation, with the generator 19 disposed to supply power to the line conductors 14, 16 and 18, when there is an increase in the flow of current in the line conductors 14, 16 and 18 there is an increase in the current flow through the current transformer 26 and thus an increase in the voltage impressed across the reactor 28. The increased voltage appearing across the reactor 28 increases the input voltage to the rectifier 22 and thus its output voltage with respect to the substantially constant output voltage of the rectifier 20. Since the output voltage of the rectifier 22 is greater in magnitude than the output voltage of the rectifier 20 when the measuring system is in operation, the center tap 54 will be at a positive potential with respect to the tap 62. The magnitude of the potential across the center tap 54 and the tap 62 is a measure of the in-phase power flowing in the line conductors 14, 16 and 18 and is dependent upon the current flow through the reactor 28, the voltage across the secondary winding 25 of the transformer 24 remaining substantially constant.

Assuming that there is a decrease in the current flow in the line conductors 14, 16 and 18 there will be a decrease in the current flow through the current transformer 26. The decreased current flow through the current transformer 26 will effect a decrease in the current flow through the reactor 28 thus decreasing the voltage thereacross. When the voltage across the reactor 28 decreases, the voltage across the input terminals of the rectifier 22 will likewise decrease, and since the voltage across the input terminals of the rectifier 20 remains substantially constant, the magnitude of the current flow through the conductors 64 and 66 and through the electrical apparatus 48 will likewise decrease.

The polarity of the voltage appearing between the tap 62 and the center tap 54 is, as was the case of the polarity of the output voltage of the embodiment shown in Fig. 1 of the drawing, dependent on the direction of flow of the power through the line conductors 14, 16 and 18. If the power is flowing from right to left through the line conductors 14, 16 and 18, the center tap 54 will be at a negative potential with respect to the tap 62.

Referring to Fig. 3 of the drawing, there is illustrated a modification of a portion of that apparatus shown in Figs. 1 and 2. In this modification a resistance member 100 is employed instead of the reactor 28 shown in Figs. 1 and 2 of the drawing. By utilizing the resistance member 100 instead of the reactor 28, the electrical responsive apparatus 48 of Figs. 1 and 2 will be responsive to the reactive kilovolt amperes flowing in the three-phase circuits represented by the line conductors 14, 16 and 18.

It is to be understood that the measuring circuits shown in Figures 1 and 2 of the drawing may with slight modifications be utilized in measuring the power flowing in a single-phase circuit. For instance, a resistance member (not shown) should be employed instead of the reactor 28 of Figs. 1 and 2 and the current transformer 26 of Figs. 1 and 2 should be associated with one of the two line conductors (not shown) that constitute the single-phase circuit, the remainder of the apparatus being the same as that shown in Figs. 1 and 2.

The measuring circuits embodying the teachings of this invention have many advantages. Among these advantages are the high speed of response of the apparatus, as well as the relatively high percentage of output power as compared to the power input to the apparatus. The measuring circuits embodying the teachings of this invention likewise give an approximately true measure of watts of their output.

I claim as my invention:

1. In a measuring circuit for measuring the power flowing in an electrical circuit, the combination comprising, two rectifier units each having input and output terminals, an impedance circuit connected to the electrical circuit to be energized by a measure of a current flowing in the electrical circuit and by a measure of a voltage in the electrical circuit, circuit means connected to said impedance circuit for applying a voltage to the input terminals of both of the rectifier units proportional to said measure of the voltage in the electrical circuit and for applying a voltage proportional to the magnitude of said current flowing in the electrical circuit to the input terminals of only one of the rectifier units, and an electrical network connected to the output terminals of the two rectifier units for producing at its output a direct-current voltage that is a measure of the difference in the output voltages of said rectifier units and thus an approximate measure of the power flowing in the electrical circuit.

2. In a measuring circuit for obtaining a measure of the power flowing in a three-phase circuit, the combination comprising, two rectifier units each having input and output terminals, a potential transformer having a primary winding connected across two phases of the three-phase circuit and a secondary winding connected to the input terminals of one of said rectifier units, a current transformer associated with the third phase of the three-phase circuit, a reactor connected across the current transformer, a circuit connecting the secondary of the potential transformer and the reactor in series across the input terminals of the other of said rectifier units, and an electrical network connected to the output terminals of the two rectifier units for producing at its output a direct-current voltage that is a measure of the difference in the output voltages of said rectifier units and thus an approximate measure of the power flowing in the three-phase circuit.

3. In a measuring circuit for measuring the reactive kilovolt-amperes flowing in a three-phase circuit, the combination comprising, two rectifier units each having input and output terminals, circuit means connecting the input terminals of one of the rectifier units to two phases of the three-phase circuit for applying a voltage to said input terminals proportional to the three-phase circuit voltage, a resistance member coupled to the third phase of the three-phase circuit to be energized by a measure of the current flowing in said phase, circuit means connecting the input terminals of the second of said rectifier units to two phases of the three-phase circuit and the resistance member in series relationship for applying a voltage to the input terminals of said second rectifier unit that is the sum of a voltage proportional to the three-phase circuit voltage and the voltage across said resistance member, and an electrical network connected to the output terminals of the two rectifier units for producing at its output a direct-current voltage that is a measure of the difference in the output of said rectifier units and thus an approximate measure of the reactive kilovolt-amperes flowing in the three-phase circuit.

4. In a measuring circuit for measuring the power flowing in a three-phase circuit, the combination comprising, two rectifier units each having input and output terminals, a reactor coupled to one phase of the three-phase circuit to be energized by a measure of the current flowing in said phase, circuit means coupling the rectifier units to two phases of the three-phase circuit and to said reactor for applying a voltage proportional to the voltage across said two phases to the input terminals of both of the rectifier units and for applying the voltage across said reactor to the input terminals of only one of the rectifier units, and an electrical network connected to the output terminals of the two rectifier units for producing at its output a direct-current voltage that is a measure of the difference in the output voltages of said rectifier units and thus an approximate measure of the power flowing in the three-phase circuit.

5. In a measuring circuit for measuring the power flowing in an electrical circuit, the combination comprising, two rectifier units each having input and output terminals, an impedance circuit connected to the electrical circuit to be energized by a measure of a current flowing in the electrical circuit and by a measure of a voltage in the electrical circuit, circuit means connected to said impedance circuit for applying a voltage to the input terminals of both of the rectifier units proportional to said measure of the voltage in the electrical circuit and for applying a voltage proportional to the magnitude of said current flowing in the electrical circuit to the input terminals of only one of the rectifier units, filter means electrically connected to the output terminals of said one of the rectifier units, other filter means electrically connected to the output terminals of said other of the rectifier units, and an electrical network electrically connected to the output of said filter means and to the output of said other filter means for producing at its output a direct-current voltage that is a measure of the difference in the output voltages of said rectifier units and thus an approximate measure of the power flowing in the electrical circuit.

6. In a measuring circuit for obtaining a measure of the reactive kilovolt-amperes flowing in a three-phase circuit, the combination comprising, two rectifier units each having input and output terminals, a potential transformer having a primary winding that is electrically connected to two of the three phases and a secondary winding that is electrically connected to the input terminals of one of the rectifier units, a current transformer associated with the third phase, a resistance member electrically connected across the current transformer, a circuit connecting the secondary winding of the potential transformer and the resistance member in series relationship to the input terminals of the other of said rectifier units, and an electrical network connected to the output terminals of the two rectifier units for producing at its output a direct-current voltage that is a measure of the difference in the output of said rectifier units and thus an approximate measure of the reactive kilovolt-amperes flowing in the three-phase circuit.

References Cited in the file of this patent

UNITED STATES PATENTS

| | | |
|---|---|---|
| 1,871,710 | Lenehan | Aug. 16, 1932 |
| 2,059,594 | Massa | Nov. 3, 1936 |
| 2,181,321 | Friedlander | Nov. 28, 1939 |
| 2,305,952 | Cravath | Dec. 22, 1942 |
| 2,551,291 | Rich | May 1, 1951 |

FOREIGN PATENTS

| | | |
|---|---|---|
| 119,648 | Sweden | Sept. 2, 1947 |